INVENTOR.
WILLIAM L. SWARTZ
ROBERT M. CHISM

ATTORNEYS

INVENTOR.
WILLIAM L. SWARTZ
ROBERT M. CHISM
BY
ATTORNEYS

INVENTOR.
WILLIAM L. SWARTZ
ROBERT M. CHISM
BY
ATTORNEYS

March 9, 1965 W. L. SWARTZ ET AL 3,172,527
BAKERY PROOFING OR COOLING APPARATUS
Filed Nov. 14, 1960 5 Sheets-Sheet 5

INVENTOR.
WILLIAM L. SWARTZ
ROBERT M. CHISM
BY
ATTORNEYS

United States Patent Office

3,172,527
Patented Mar. 9, 1965

3,172,527
BAKERY PROOFING OR COOLING APPARATUS
William L. Swartz and Robert M. Chism, Saginaw, Mich., assignors to Baker Perkins Inc., Saginaw, Mich., a corporation of New York
Filed Nov. 14, 1960, Ser. No. 68,945
5 Claims. (Cl. 198—138)

This invention relates to proofers or coolers for commercial bakeries and more particularly to certain new and useful improvements in proofers or coolers of the type wherein rack carriers having shelves for carrying products such as pans or tins of bread, buns, or cakes are transported in a circuit within a housing in which a cooling or proofing atmosphere is maintained.

Proofers or coolers of this type in which the carriers move around a conveyor circuit having an elevator portion, upper side run portion, a lowerator portion, and a lower side run portion, and in which the loading and unloading of the product takes place at the elevator portion of the conveyor, are well known and illustrated, for example, in Temple Patent No. 2,823,811. The proofing of farinaceous food products prior to feeding them into a baking oven or the cooling of freshly baked food products as they emerge from the oven must be accomplished gradually, as is well known in the art. However, proofing or cooling apparatus of this type is operated at varying speeds, dependent on the product being treated. For instance, buns are transported at a relatively rapid rate in comparison with bread.

At installations which handle a wide variety of products or pans, one of the problems encountered in a system of the type mentioned, wherein the carriers are provided with a roller on each side for horizontal travel on the upper and lower rails of the conveyor assembly and vertical travel in engagement with elevator and lowerator guides, is that of tipping or tilting of the carriers as they travel around the turns because of unbalanced loading of the carrier shelves. With carriers traveling at a rate which may be 18 feet per minute and the pans on the shelves of the carriers off-centered, there is a tendency for a carrier to tilt as it proceeds from the upper run of the conveyor system to the lowerator, for instance, and to remain tilted until it nears the bottom of the housing, whence it then straightens out suddenly when it is required to turn again. The sudden lurch which occurs when the carrier resumes a true vertical position may throw the panned products off the shelves and, of course, in the case of proofed dough provides a shock factor which results in deflation of the dough, even though the pans are not thrown off the shelves.

One of the prime objects of the present invention is to provide a controlled or stabilized system in which control of the racks is always maintained throughout their travel and it is not possible for a rack to tilt, tip, or lurch in the manner indicated. Briefly, this is accomplished with the addition of additional roller members on the racks or carriers and curvilinear channel guides which receive the rollers and guide the carriers to vertical strips which maintain their true vertical position during ascension or descent. Additional curvilinear channel guides are provided adjacent the horizontal runs of the conveyor system to receive additional rollers on the carriers and guide each carrier into end-to-end engagement with the preceding carrier and prevent tilting.

A further object of the invention is to provide a stabilized system of the character described which can be conveniently and economically installed in existing proofers or coolers as well as in new installations and is of economical as well as reliable design.

A further object of the invention is to provide a proofer or cooler system in which the carriers have a smooth travel which is controlled at all times by relatively few parts which do not interfere with the operation of the conveyor apparatus.

A still further object of the invention is to provide stabilizing apparatus which can be rapidly installed to provide the customer with a considerably improved proofer or cooler at little additional expense.

Other objects and advantages of the invention will be pointed out specifically or will become apparent from the following description when it is considered in conjunction with the appended claims and the accompanying drawings, in which:

Figure 3:
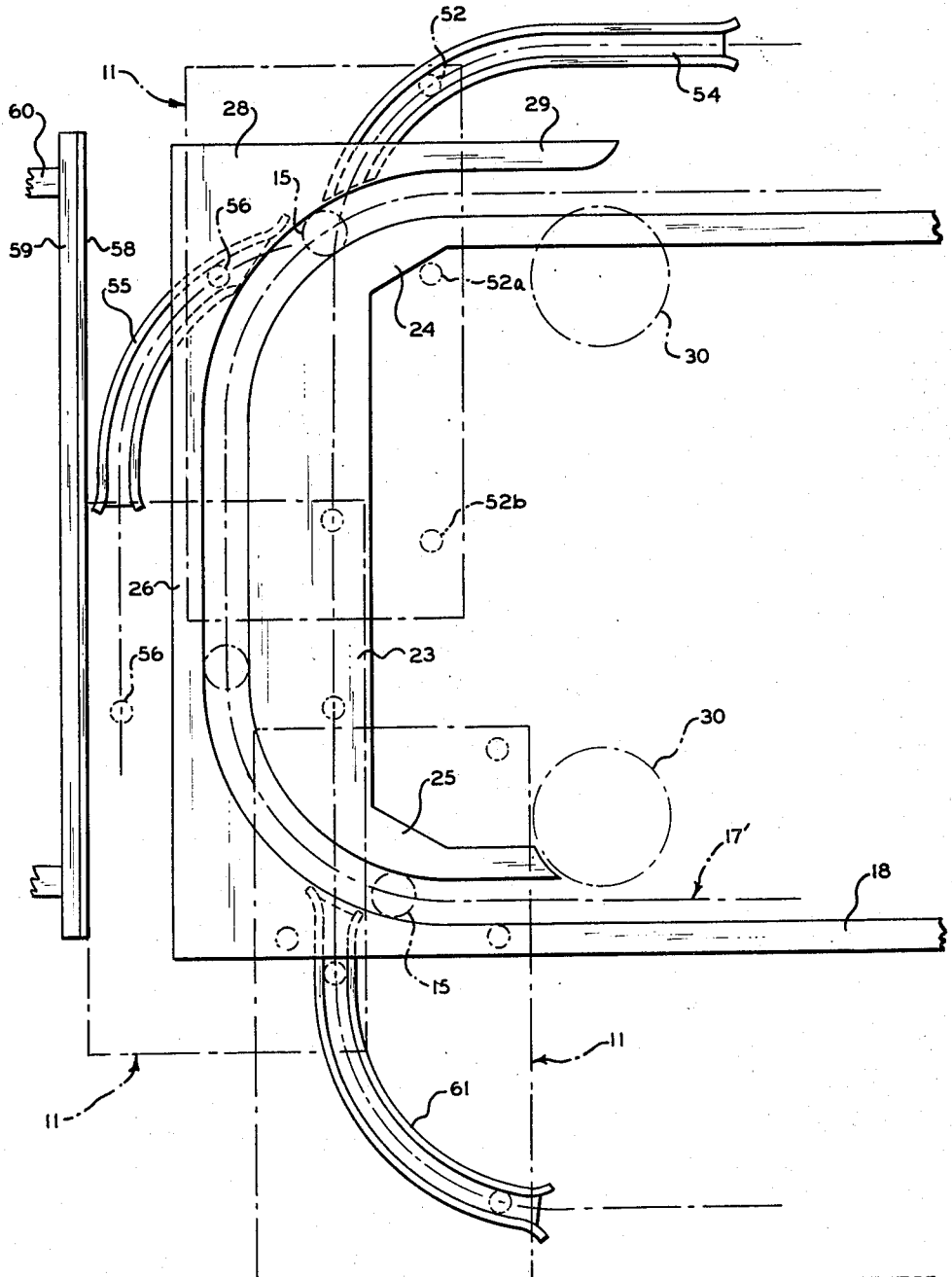
Figure 4:
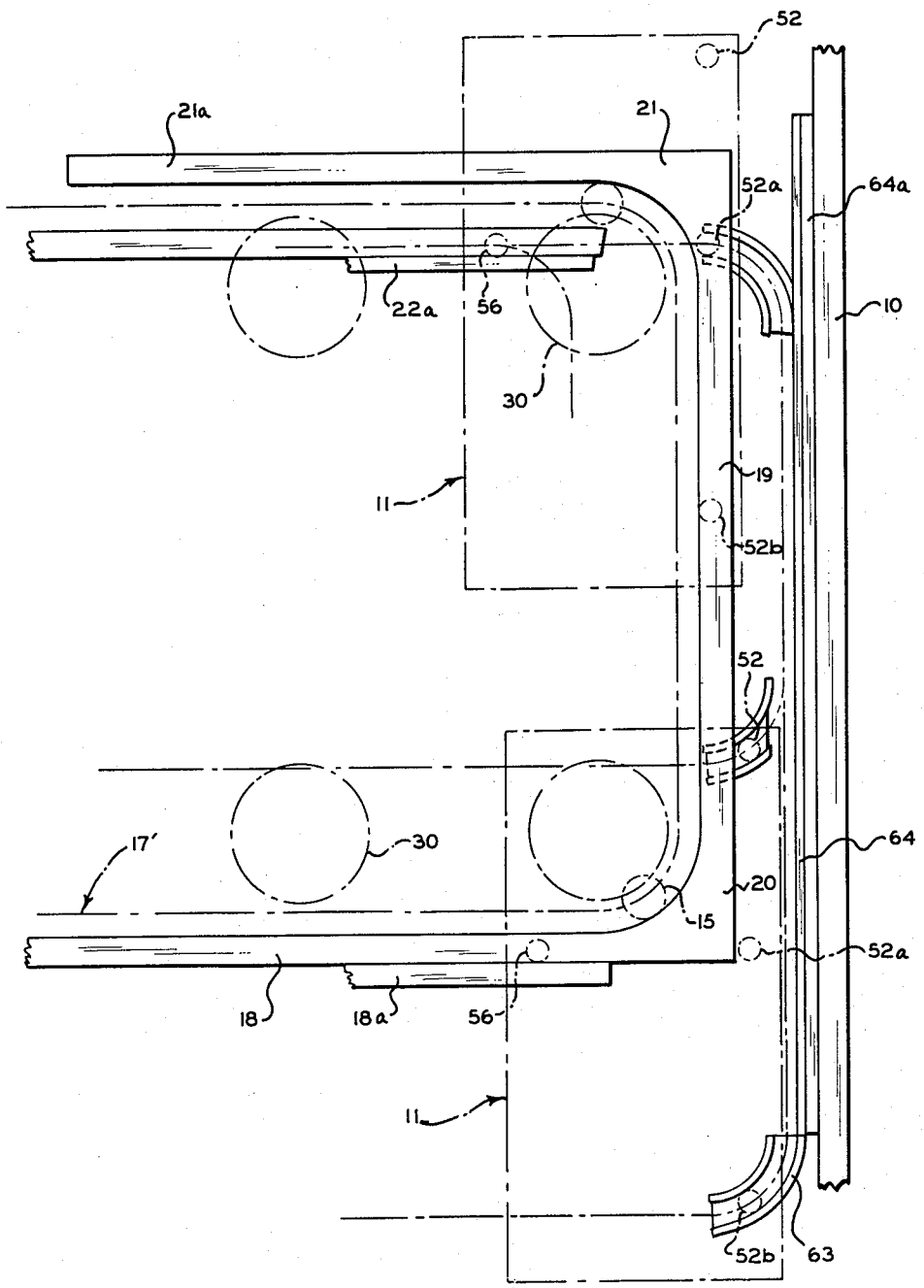

FIGURE 3 is an enlarged, side elevational view of the guide members at the lowerator end of the housing only, the diagrammatic lines indicating a drive chain and sprockets and various positions of a carrier in its descent from the upper run conveyor rail to the lower run conveyor rail; and FIGURE 4 is a similar enlarged, side elevational view of the elevator end of the housing, showing the guide members only and with diagrammatic lines indicating the sprocket and chain drive system and several positions of a carrier as it is moved from the lower run conveyor rail to the upper run conveyor rail.

Figure 1:
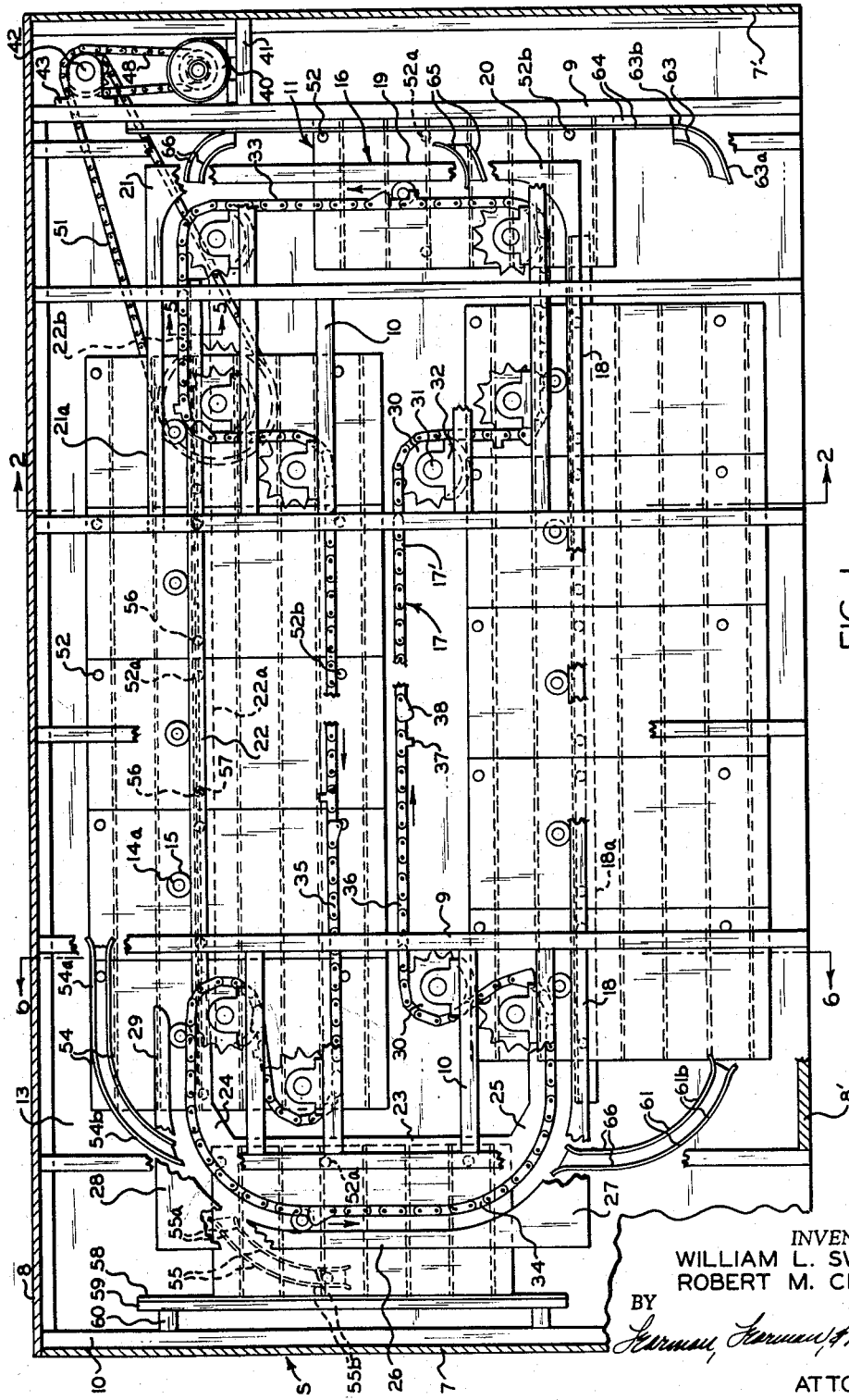
FIGURE 1 is a sectional, side elevational view of proofer or cooler apparatus which incorporates the stabilizing apparatus of the present invention.
Figure 5:
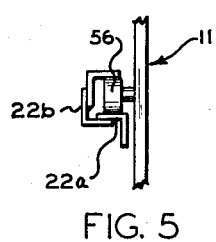

FIGURE 5 is an enlarged, transverse sectional view taken on the line 5—5 of FIGURE 1.

Figure 6:
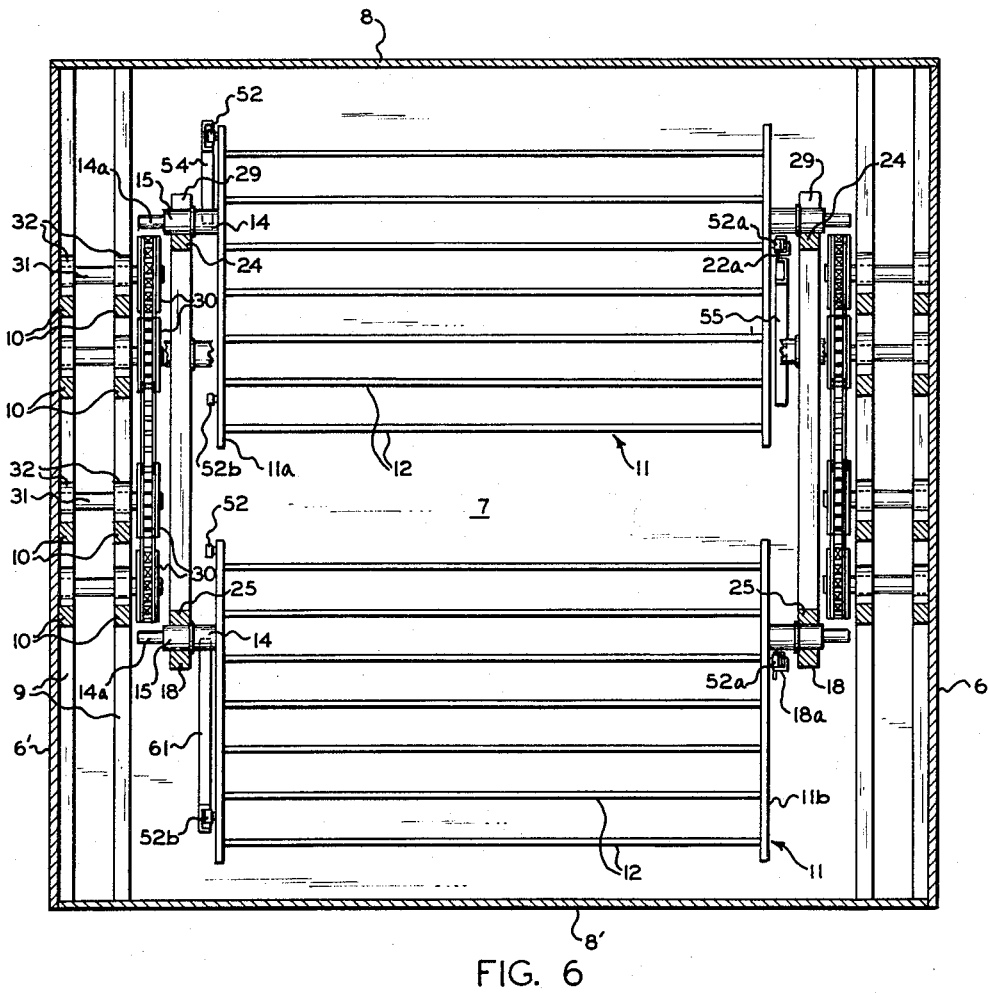

FIGURE 6 is a sectional, end elevational view taken on the line 6—6 of FIGURE 1.

Referring now more particularly to the accompanying drawings, in which we have shown a preferred embodiment of the invention only, apparatus constructed in accordance with the invention includes a housing structure indicated generally by the reference letter S and including side walls 6, 6', rear and front end walls 7, 7', respectively, and top and bottom walls 8, 8', respectively, which are supported by a skeleton framework of suitable design which for the sake of simplicity will be described as including only vertical and horizontal members 9 and 10, respectively. Suitable fans or atmosphere conditioning means are disposed inside the housing S to provide the desired temperature and humidity conditions within the proofer or cooler in the usual manner.

Racks or carriers, which are generally indicated by the reference numeral 11, have side walls 11a, 11b and rack shelves 12 which are adapted to support a plurality of pan sets or the like within the proofing chamber 13 and, as has been noted, are adapted to travel in a continuous circuit from the front end of the housing S to the rear end and back to the front end once again where products are loaded and unloaded. The loading and unloading members for supplying the products to and from the shelves 12 of the racks 11 are not shown, however, may be of the type shown in the patent to which reference has been made.

Figure 2:
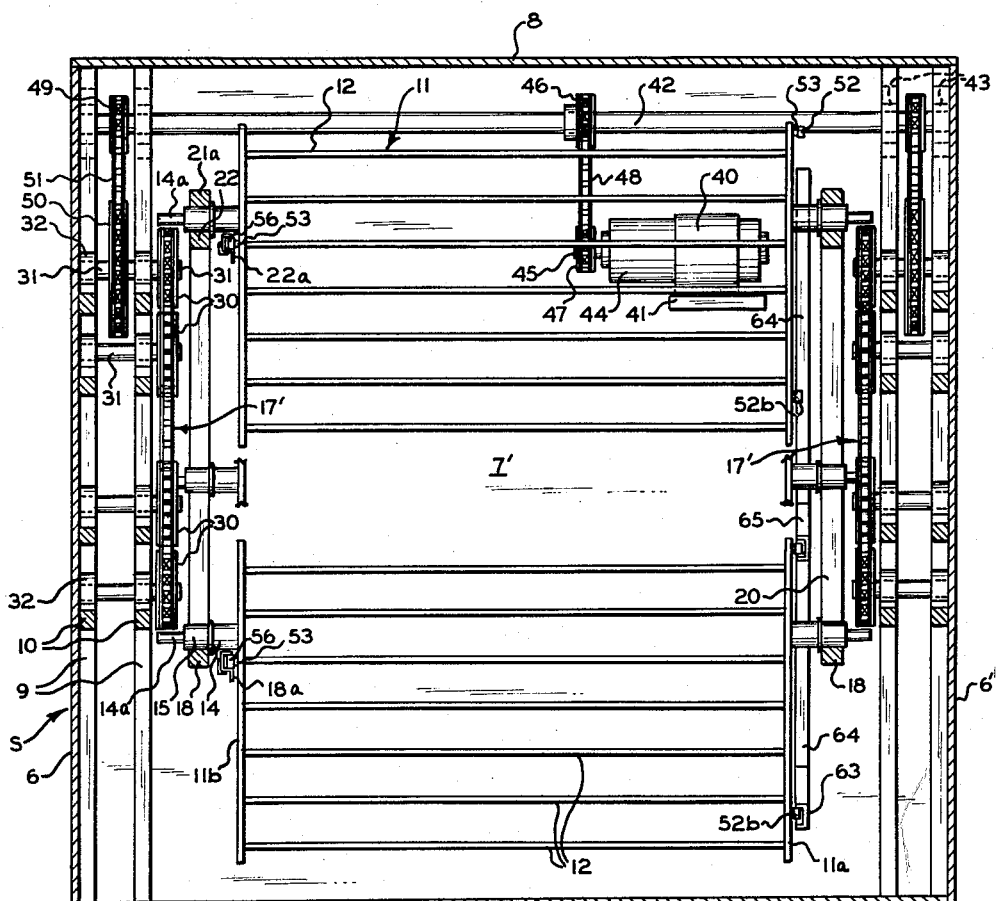
FIGURE 2 is a sectional, end elevational view taken on the line 2—2 of FIGURE 1.

Rotatably provided on each rack or carrier 11 on stub shafts 14 (FIGURE 2) are roller members 15 which it will be seen are substantially centrally located relative to the depth of the racks and which are located slightly above center relative to the height of the racks. These rollers 15 are adapted to travel in the conveyor loop guide system generally indicated by the numeral 16, as the carriers are moved around the circuit by an endless drive chain generally indicated by the numeral 17. Referring to FIGURE 1, the conveyor guide loop system comprises a pair of transversely spaced, parallel, lower rail or track sections 18 forming a lower reach or run of the loop system 16 and communicating at their front ends with guides composed of a pair of similarly spaced, parallel, vertical sections 19 arranged to form a front vertical reach or run of the loop system 16. The vertical sections 19 have arcuate sections 20 and 21 at their ends. Communicating with the upper ends 21 of the sections 19 are pairs of parallel, spaced, horizontal rails 22 forming an upper horizontal run of the loop system 16 which parallels the lower run members 18 of the latter, and it will also be noted that the vertical members 19 of the loop system 16 have horizontal extensions 21a extending horizontally rearwardly at a spaced distance just slightly more than the diameter of roller members 15 above the tracks 22, as shown. Communicating the rear ends of the lower and upper track members 18 and 22 are a pair of parallel, vertical run members 23 which have curvilinear end portions 24, 25, and spaced rearwardly thereof a distance slightly more than the diameter of rollers 15 are a pair of generally vertically disposed run members 26 which connect with the lower track sections 18 at their curvilinear lower ends 27, and at their curvilinear upper ends 28 with forwardly extending track sections 29 spaced a similar distance above the guide track sections 24. In the travel of carriers 11 around the loop system 16 the rollers 15 are in engagement with the sets of members 21a and 22, 24, and 29, 23, and 26, and 25 and 18 at all times.

The endless chain conveyor generally indicated by the numeral 17 comprises a pair of endless link chain members 17' supported in transversely parallel relation by a plurality of sprockets 30 fixed on shafts 31 which are rotatably supported by bearings 32 from the horizontal frame members 10. As indicated in FIGURE 1, each chain 17' includes an elevator run portion 33 and a lowerator run portion 34 and these portions 33 and 34 are connected by vertically inset, horizontally extending portions 35 and 36. The conveyor chain system 17 shown is in all respects identical to that shown and described in applicants' assignee's co-pending application Serial No. 761,130 and similarly includes links with lug members 37 and pivotal latch members 38 which in the manner described in the foregoing application engage with the extended portions 14a of the shafts 14 to move the carriers 11 around the circuit in a manner which need not further be described in the present application.

A motor 40, mounted by a platform 41 at the front end of the housing S, can be provided to drive a jack shaft 42, supported in bearings 43, through a reduction gear box 44, sprockets 45 and 46 on the gear box shaft 47 and jack shaft 42, respectively, and a chain 48 trained around the sprockets 45 and 46. At its ends the shaft 42 mounts sprockets 49 which drive sprockets 50 on the stub shafts 31 through chains 51. The chains 17', comprising the conveyor system generally designated 17, may be driven in this way or, of course, they may be driven in any other suitable manner.

The aforementioned elements form no part of the present invention except as they cooperate with certain guide and stabilizing members to which reference will now be made. Along the right edge of each rack or carrier 11 in FIGURE 1 upper and lower rollers 52 and 52b are provided rotatably mounted on stub shafts 53 which extend inwardly from the one side wall 11a. The rollers 52 are in position to be received by a curvilinear channel guide 54 at the upper rear end of the chamber 13 which includes a longitudinally extending portion 54a and a downwardly curving portion 54b. The guide track 54 cooperates with a guide track 55 rearwardly and below the track or guide 54 which has a vertically curved front section 55a and a vertically extending lower portion 55b. Rear edge rollers 56 on shafts 57 located heightwise slightly above the center of racks 11 are provided in a position to position the racks 11 against the nylon wear surface 58 of a vertical guide 59, mounted by brackets 60, when the rollers 56 reach the vertically extending section 55b of the track 55.

At the lower rear portion of chamber 13 a curvilinear channel track 61 is provided for receiving the rollers 52b (FIGURE 3) and guiding the racks from the wear surface 58 into abutting relationship with the preceding rack in each case and, as shown, the track includes a vertically extending section 61a and a vertically and forwardly curving section 61b. In the lower front portion of chamber 13 a curvilinear guide channel 63 is provided which includes a curvilinear lower portion 63a and a vertical portion 63b. The guide 63 receives the lower rollers 52b (see FIGURE 4) as the rollers 15 on racks 11 move from the lower run rails 18 to the vertical guides 19 and, as will be seen, the rollers 52b of the racks are brought into engagement with a vertical angle guide strip 64 and aid in stabilizing the racks 11 as they move upwardly. Also assisting in the transfer from the rails 18 is a guide channel 65 which receives the rollers 52. A curvilinear guide channel 66 receives the rollers 52a (see FIGURE 4) which are mounted on the shafts 53 on the racks' sides 11a and maintains the racks 11 in true vertical position as they are transferred from the elevator portion of the circuit to the upper run conveyor portion of the circuit. Further, during passage rearwardly and forwardly the rollers 56 and 52a are received upon longitudinal rails 22a and 18a, respectively, thus holding the racks vertically stable. At the front of the housing, rails 22b, fixed to the rails 22a (see FIG. 5), extend rearwardly a short distance (FIG. 2) and guide the rollers 56 and 52a as the racks round the corner, to positively prevent any tilting of the racks.

In the case of guide channels 54, 55, and 61 the receiving sides are flared outwardly to guide the rollers into position and the terminal sides of guides 55 and 61 are flared in the same manner. In the case of guide channels 63 and 65, the receiving sides of the guides are flared and in the case of the upper guide channel 65 it will be seen that a side extension is provided which guides the rollers 52 into position against guide strip 64.

In operation, (see FIGURES 3 and 4), as the racks 11 are loaded and unloaded at the front end of the chamber 13 the guide rollers 52 and 52b are in engagement with the strip 64. During the time each rack 11 is moved upwardly and laterally to transfer to the conveyor rails 22, the rollers 52a are received between the guides 66 and the rollers 52a and 56 between rails 22a and 22b and any tilting of the racks 11 is prevented. When a particular rack 11 reaches the rear upper end of the chamber, the rollers 52 are engaged in the guide channel 54 which stabilizes the rack and prevents its tilting until the rollers 56 can be received by the track 55 and the rack be brought into engagement with the wear surface 58. At the lower rear end of the chamber 13, when a particular rack 11 is to be transferred to the lower run tracks 18, the guide channel 61 receives the roller 52b. Tracks 22 and 18 support the weight of the racks and rollers 52a and 56 move on tracks 22a and 18a and stabilize the racks during longitudinal travel. During the descent and transfer of the racks, the tracks 54, 55, and 61, in cooperation with the guides 25 and 26, positively prevent any swaying or tilting. When the racks are ready to be unloaded and reach the lower front end of chamber 13, the rollers 52b (see FIGURE 4) are received by the guide 63, and the rollers 52 by the guide section 65, and hold the racks in true vertical position until they can come into engagement with the vertical guide strip 64.

It should be apparent that we have perfected a practical, stabilized system in which, throughout the circuit of travel, there is never a loss of control of any of the racks 11.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. Material handling apparatus including a housing structure; spaced apart, upper and lower, generally longitudinally extending rails within said housing; longitudinally spaced apart, generally vertically extending guides communicating with said rails at the ends thereof; endless conveyor means having generally vertically disposed runs extending alongside said vertically extending guides and longitudinally disposed runs; carriers with vertically spaced shelves having guide means for engagement with said longitudinal rails for supporting the carriers therefrom which is engageable with said vertical guides; means on said endless member for engagement and disengagement with said guide means on said carriers successively to move the carriers longitudinally and vertically in a circuit; second guide means on said carriers; a vertically disposed guide surface longitudinally outwardly of said rails and one of said vertical guides at one end of said circuit in the longitudinal plane of travel of said carriers; and curvilinear track means inward of said guide surface receiving said second guide means near a confluence of said longitudinally extending rails and vertically extending guides and cooperating with said vertical guides to maintain said carriers in true vertical plumb while bringing them into end engagement with said vertically disposed guide surface.

2. Material handling apparatus including a housing structure; spaced apart, upper and lower, generally longitudinally extending rails within said housing; longitudinally spaced apart, generally vertically extending guides substantially connecting said rails near the ends thereof; endless conveyor means having generally vertically disposed runs extending alongside said vertically extending guides of each pair and longitudinally disposed runs generally parallel with said rails; carriers with vertically spaced shelves having roller means for engagement with said longitudinal rails for supporting the carriers therefrom and engageable with said vertical guides; means spaced on said endless member for engagement and disengagement with said roller means on said carriers successively to move the carriers longitudinally and vertically in a circuitous travel; second roller means on said carriers; first curvilinear guide means restricting movement of said second roller means adjacent the confluence of one of said longitudinally extending rails and vertically extending rails to guide said carriers in a stabilized arcuate path; third roller means on said carriers; a vertical guide surface in the longitudinal plane of travel of said carriers at one end of the path of travel of said carriers outward of said first curvilinear guide means; and second curvilinear guide means inward of said vertical guide surface and positioned outward of said first guide means, receiving said third roller means at about the time said second roller means leaves said first guide means for guiding said carriers in a continuing arcuate path into top to bottom end engagement with said vertical guide surface.

3. Material handling apparatus including a housing structure; spaced apart, upper and lower, generally longitudinally extending rails within said housing; longitudinally spaced part, generally vertically extending front and rear guides substantially connecting said rails near the front and rear ends thereof; endless conveyor means having generally vertically disposed runs extending alongside said vertically extending rails of each pair and longitudinally disposed runs generally parallel with said rails; carriers with vertically spaced shelves having first rollers for engagement with said longitudinal rails for supporting the carriers therefrom which are engageable with said vertical guides; means spaced on said endless member for engagement and disengagement with said first rollers on said carriers successively to move the carriers longitudinally and vertically in a circuitous travel; second rollers on said carriers above and forwardly of said first rollers; first spaced apart curvilinear guides above the rear end of the upper rail restricting movement of said second rollers to cooperate with said upper rail and rear guide in moving said racks in vertical plumb in a stabilized arcuate path; third rollers on said carriers longitudinally rearward of said first rollers; and a rear vertical guide surface rearward of said first curvilinear guides in the longitudinal plane of travel of said carriers at the rear end of the path of travel of said carriers and second spaced apart curvilinear guides forward of said guide surface and positioned rearward of and below said first curvilinear guides receiving a third roller at about the time a second roller leaves said first curvilinear guides for guiding said carriers in a continuing arcuate path into end engagement with said vertical guide surface.

4. Material handling apparatus including a housing structure; spaced apart, upper and lower, generally longitudinally extending rails within said housing; longitudinally spaced apart, generally vertically extending front and rear guides substantially connecting said rails near the ends thereof; endless conveyor means having generally vertically disposed runs extending alongside said vertically extending guides of each pair and longitudinally disposed runs generally parallel with said upper and lower rails; carriers with vertically spaced shelves having transversely spaced first rollers for engagement with said longitudinal rails for supporting the carriers therefrom which are engageable with said vertical guides; means spaced on said endless member for engagement and disengagement with said first rollers on said carriers successively to move the carriers longitudinally and vertically in a circuitous travel; a second roller on said carriers above and forwardly of said first rollers; first curvilinear guide means restricting movement of said second roller adjacent the confluence of said lower rail and front guide cooperable with said first rollers to guide said racks in a stabilized arcuate path; a third roller on said carriers below and forwardly of said first rollers; a front vertical guide surface in the longitudinal plane of travel of the carriers at the front of the path of travel of said carriers forwardly of said first guide means; and second curvilinear guide means, rearwardly of said vertical guide surface and positioned below said first guide means, receiving said third roller at substantially the same time said second roller is received by said first guide means for guiding said carriers in a continuing arcuate path in a state of vertical plumb into end engagement with said vertical guide surface.

5. Material handling apparatus including a housing structure; spaced apart, upper and lower, generally longitudinally extending rails within said housing having front and rear ends; longitudinally spaced apart, generally vertically extending front and rear guides substantially connecting said rails near the ends thereof; endless conveyor means, having generally vertically disposed runs extending alongside said vertically extending guides and longitudinally disposed runs, moving said carriers upwardly at the front ends of the rails and downwardly at the rear ends thereof; carriers with vertically spaced shelves having transversely spaced first guide means for engagement with said vertically extending guides and also with said longitudinal rails for supporting the carriers therefrom; means spaced on said endless means for engagement and disengagement with said carriers successively to move the carriers longitudinally and vertically in a circuitous travel; second guide means on said carriers; curvilinear guide track means adjacent the rear ends of said upper rails receiving said second guide means; and a rear vertical guide surface in the longitudinal plane of travel of the carriers at the rear of the path of travel of said carriers, spaced rearwardly of said curvilinear guide track means and positioned to receive the carriers therefrom, maintaining the carriers in a state of vertical plumb as they descend in engagement with said rear guide surface.

References Cited by the Examiner
UNITED STATES PATENTS

| | | | |
|---|---|---|---|
| 2,729,531 | 1/56 | Andersen | 198—138 |
| 2,823,811 | 2/58 | Temple | 214—16.4 |

SAMUEL F. COLEMAN, *Primary Examiner.*

SAMUEL LEVINE, RAPHAEL M. LUPO, ABRAHAM BERLIN, *Examiners.*